(12) United States Patent
Ezrielev et al.

(10) Patent No.: US 12,393,714 B1
(45) Date of Patent: Aug. 19, 2025

(54) MANAGING INFERENCE MODELS TO MEET DATA PRIVACY REGULATIONS

(71) Applicant: Dell Products L.P., Round Rock, TX (US)

(72) Inventors: Ofir Ezrielev, Be'er Sheva (IL); Jehuda Shemer, Kfar Saba (IL); Boris Shpilyuck, Ashdod (IL)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 18/443,788

(22) Filed: Feb. 16, 2024

(51) Int. Cl.
  *G06F 21/62* (2013.01)
  *G06N 5/04* (2023.01)
  *H04L 9/40* (2022.01)

(52) U.S. Cl.
  CPC .......... *G06F 21/6218* (2013.01); *G06N 5/04* (2013.01); *H04L 63/04* (2013.01)

(58) Field of Classification Search
  CPC ........ G06F 21/6218; G06N 5/04; H04L 63/04
  See application file for complete search history.

(56) References Cited

U.S. PATENT DOCUMENTS

| 11,984,208 B2* | 5/2024 | Athey ............... G16B 40/00 |
| 12,045,199 B1 | 7/2024 | Sorenson, III et al. |
| 2015/0186434 A1 | 7/2015 | Eichinger |
| 2018/0219889 A1 | 8/2018 | Oliner |
| 2019/0220533 A1 | 7/2019 | Guisado |
| 2020/0151291 A1 | 5/2020 | Bhattacharyya |
| 2020/0167422 A1 | 5/2020 | Jayasingh |
| 2020/0167423 A1 | 5/2020 | Jayasingh |
| 2021/0089509 A1 | 3/2021 | Jayasingh |
| 2022/0150125 A1* | 5/2022 | Kumar ............... G06N 20/00 |
| 2023/0186070 A1* | 6/2023 | Makhija ............. G06N 5/01 705/318 |
| 2024/0314608 A1* | 9/2024 | Alanis ............... H04W 24/10 |
| 2025/0068133 A1* | 2/2025 | Hegde ............... G06Q 50/163 |
| 2025/0138729 A1 | 5/2025 | Zhao |

* cited by examiner

*Primary Examiner* — El Hadji M Sall
(74) *Attorney, Agent, or Firm* — WOMBLE BOND DICKINSON (US) LLP

(57) ABSTRACT

Methods and systems for managing inference models are disclosed. An inference model may be divided into any number of sub-network units and each sub-network unit of the sub-network units may be located in a different geographical location. Data privacy regulations may apply to the geographical locations. Therefore, a first sub-network unit may be subject to a first data privacy regulation and a third sub-network unit may be subject to a second data privacy regulation. If an output of a sub-network unit is not usable by a downstream sub-network unit due to differences in data privacy regulations, the first sub-network unit may be replaced with a second sub-network unit, the second sub-network unit generating an output that does meet the data privacy regulations of the downstream sub-network unit. Doing so may reduce interruptions to inference generation by the inference model.

20 Claims, 8 Drawing Sheets

| Snapshot 240 | | | | First Predictive Performance Goal: 80% 264 |
|---|---|---|---|---|
| First Iteration Weights 246 | Reconstruction Loss: 50% 248 | Predictive Performance: 50% 250 | | |
| Snapshot 242 | | | | Second Predictive Performance Goal: 70% 266 |
| Second Iteration Weights 252 | Reconstruction Loss: 30% 254 | Predictive Performance: 70% 256 | | |
| Snapshot 244 | | | | |
| Third Iteration Weights 258 | Reconstruction Loss: 15% 260 | Predictive Performance: 85% 262 | | |

FIG. 2C

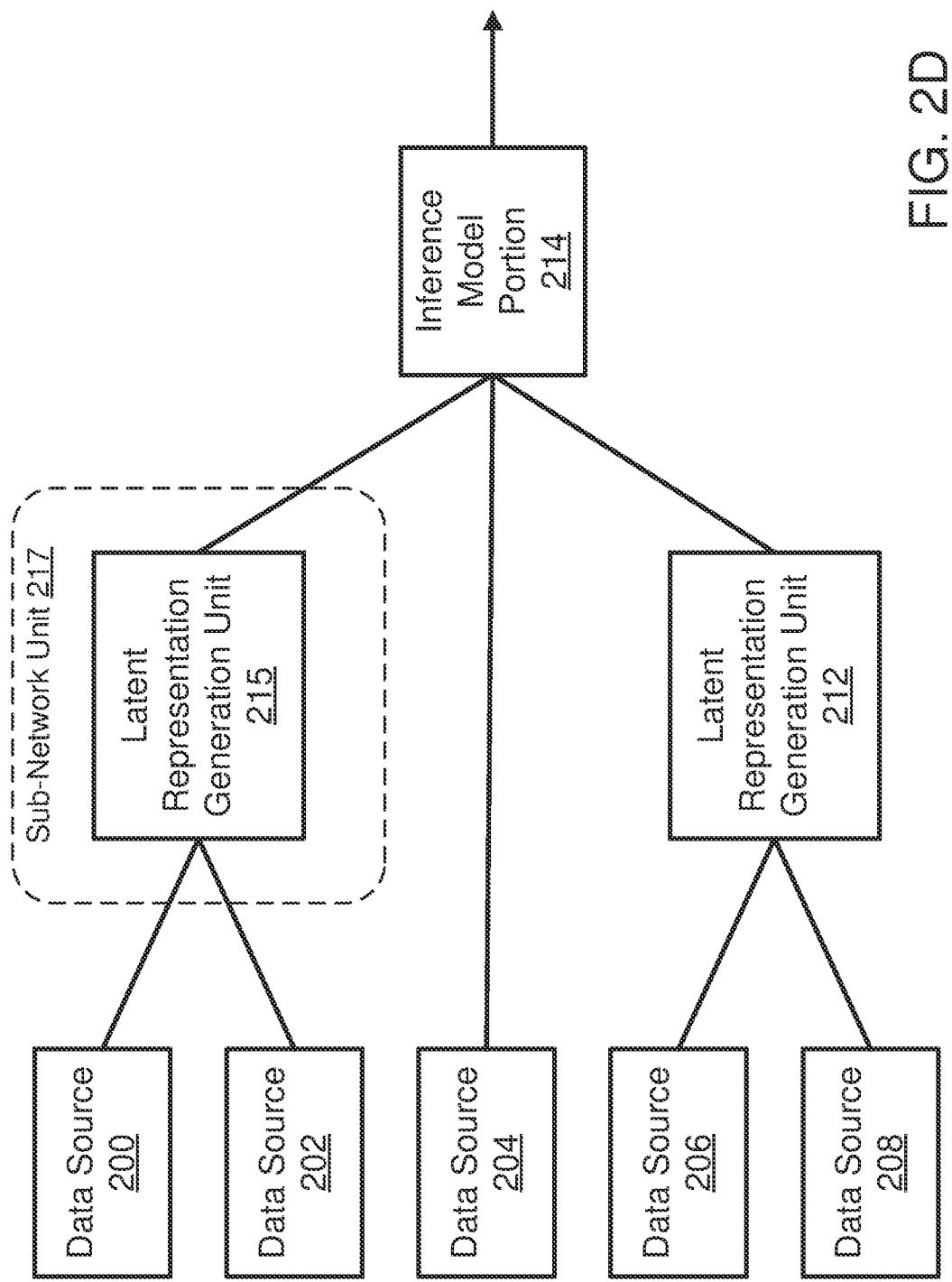

MANAGING INFERENCE MODELS TO MEET DATA PRIVACY REGULATIONS

FIELD

Embodiments disclosed herein relate generally to inference models. More particularly, embodiments disclosed herein relate to systems and methods to manage compliance of inference models with data privacy regulations.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2E show an example inference model over time in accordance with an embodiment.

DETAILED DESCRIPTION

Figure 1:
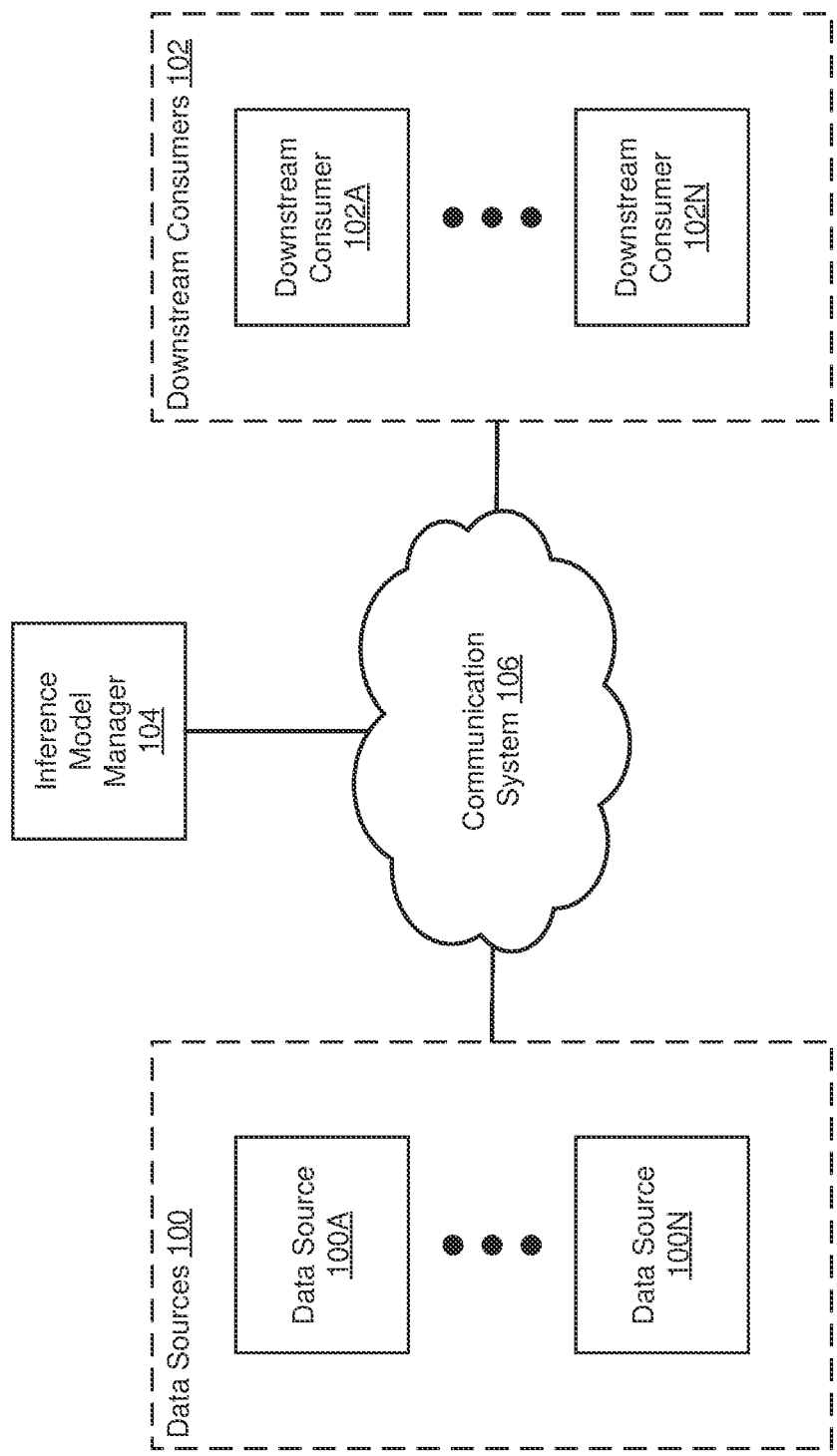
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing an inference model. The inference model may generate inference model results (e.g., inferences) by ingesting input data from any number of data sources and may provide the inference model results to any number of downstream consumers. Therefore, reliable provision of computer-implemented services (e.g., inference generation, use of inferences generated by the inference model) may rely on reliability of inference generation by the inference model.

The inference model may be made up of modular sub-network units, each sub-network unit of the modular sub-network units including a portion of the inference model. By utilizing modular sub-network units, the portions of the inference model may be substituted with other pre-trained portions of the inference model (e.g., other sub-network units) when needed. For example, a first sub-network unit may fail (e.g., and/or a data source associated with the first sub-network unit may become unavailable). To reduce interrupts to inference generation by the inference model, at least a second sub-network unit may replace the first sub-network unit.

Due to the modular nature of the inference model, different portions of the inference model may be hosted by different entities throughout a distributed environment. However, reliability of inference generation by the inference model may decrease if different portions of the inference model (e.g., different sub-network units) are hosted by different entities subject to different data regulatory frameworks.

For example, the first sub-network unit may be hosted by a first entity located in a first geographical location that is subject to a first set of data regulations. The first set of the data regulations may indicate guidelines for data privacy. A third sub-network unit may ingest an output from the first sub-network unit and to generate partially processed data as part of inference generation. However, the third sub-network unit may be hosted remote to the first sub-network unit by a second entity located in a second geographical location. The second geographical location and, therefore, the third sub-network unit may be subject to a second set of data regulations. The second set of the data regulations may indicate different guidelines for data privacy than the first set of the data regulations. Therefore, data usable by the first sub-network unit may not be usable by the third sub-network unit and if the output of the first sub-network unit does not meet the second set of the data regulations, inference generation may be interrupted or stopped.

To reduce interruptions to inference generation due to differences in data privacy regulations, sub-network units may be replaced in the inference model. A first sub-network unit may be replaced if, for example, an output of the first sub-network unit does not meet data privacy regulations associated with a downstream sub-network unit of the inference model. The downstream sub-network unit may be portion of the inference model that ingests an output of the first sub-network unit.

Replacing the first sub-network unit may include identifying a second sub-network unit that produces an output that meets the data privacy restrictions associated with the downstream sub-network unit. The second sub-network unit may be identified, for example, from a list of prior iterations of the first sub-network unit generated during training of the inference model. The second sub-network unit may produce the output that meets the data privacy restrictions associated with the downstream sub-network unit by generating a latent representation of input data that with a higher degree of reconstruction loss than the first sub-network unit.

Thus, embodiments disclosed herein may provide an improved system for managing inference models so that interruptions to inference generation by the inference models are reduced. Portions of an inference model may be subject to data privacy regulations (and/or other regulations) that may limit use of data during inference generation. The disclosed embodiments may address this technical problem by substituting pre-trained modular (e.g., interchangeable) sub-network units of the inference model as needed in response to identified data privacy restrictions during, for example, deployment of the inference model.

In an embodiment, a method for managing an inference model that comprises sub-network units is provided. The method may include: identifying a first sub-network unit of the sub-network units, the first sub-network unit generating first data that does not satisfy data privacy regulations using input data, and the first sub-network unit being configured to provide the first data to a portion of the inference model in order to generate, at least in part, an inference model result; obtaining a second sub-network unit that ingests the input data to generate second data that satisfies the data privacy regulations; replacing the first sub-network unit with the second sub-network unit to obtain an updated inference model; and executing the updated inference model to obtain the inference model result in accordance with the data privacy regulations.

The data privacy regulations may limit distribution of the input data.

The first sub-network unit may not be subject to the data privacy regulations and the portion of the inference model may be subject to the data privacy regulations.

Identifying the first sub-network unit may include: obtaining first reconstructed input data using, at least, the first sub-network unit and a portion of the input data; obtaining a reconstruction loss based on the first reconstructed input data and the input data; and making a determination regarding whether the first data satisfies the data privacy regulations based on the reconstruction loss and a reconstruction threshold.

The first sub-network unit may be trained during a training process using training data and a first predictive performance goal, the second sub-network unit may be obtained via a portion of the training process that uses the training data and a second predictive performance goal, and the first predictive performance goal may be different from the second predictive performance goal.

Second reconstructed input data obtained using, at least, the second sub-network unit and the portion of the input data, may satisfy the data privacy regulations based on the reconstruction threshold, the reconstruction threshold specifying a minimum level of difference between the second reconstructed input data and the portion of the input data.

The first sub-network unit may include a portion of an autoencoder, and the autoencoder being trained to reproduce the input data.

The first sub-network unit may include an encoder of the autoencoder, and the second sub-network unit may include a second encoder of a second autoencoder.

The encoder may be trained to generate a reduced-size representation of the input data.

The method may also include providing a computer-implemented service using the inference model result.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services that may utilize inference models as part of the provided computer-implemented services.

The inference models may be artificial intelligence (AI) models and may include, for example, linear regression models, deep neural network models, and/or other types of inference generation models. The inference models may be used for various purposes. For example, the inference models may be trained to recognize patterns, automate tasks, and/or make decisions.

The computer-implemented services may include any type and quantity of computer-implemented services. The computer-implemented services may be provided by, for example, data sources 100, inference model manager 104, inference consumers 102, and/or any other type of devices (not shown in FIG. 1). Any of the computer-implemented services may be performed, at least in part, using inference models and/or inferences obtained with the inference models.

Data sources 100 may include any number of data sources (100A-100N) that may obtain (i) training data usable to train inference models, and/or (ii) ingest data that is ingestible into trained inference models to obtain corresponding inferences. The inferences generated by the inference models may be provided to inference consumers 102 for downstream use.

To reduce interruptions to inference generation and, therefore, reduce interruptions to the computer-implemented services, the inference model may be made up of any number of sub-network units. Each sub-network unit may include a portion of the inference model (e.g., a portion of an autoencoder, a data processing unit, any number of layers of a neural network inference model). The sub-network units may be modular (e.g., may be substituted for other sub-network units) without requiring re-training processes for the sub-network units and/or the inference model.

However, due to the modular nature of the inference model, the inference model may be divided into any number of sub-network units. Different sub-network units may be hosted by different entities throughout a distributed environment and the different entities may also be located in different geographical locations.

For example, a first portion of the inference model (e.g., a first sub-network unit) may be hosted by a first entity located in a first geographical location. The first portion of the inference model may obtain input data from any number of data sources and/or other sub-network units and may process the input data to obtain first partially processed data. The first sub-network unit may include a latent representation generation unit (e.g., a portion of an autoencoder) and the first partially processed data may include latent representations (e.g., reduced-size representations) of the input data.

A second portion of the inference model (e.g., a second sub-network unit) may be hosted by a second entity located in a second geographical location. The second portion of the inference model may obtain the first partially processed data from the first portion of the inference model and may ingest the first partially processed data to obtain second partially processed data. The second portion of the inference model may include: (i) any number of layers of a neural network, (ii) portions of autoencoders, (iii) other data processing units, and/or (iv) other means of processing data.

However, the first geographical location may be subject to a first set of data privacy regulations and the second geographical location may be subject to a second set of data privacy regulations, the second set of the data privacy regulations being different from the first set of the data privacy regulations. The input data and the first partially processed data may meet the first set of the data privacy regulations but may not meet the second set of the data privacy regulations. Therefore, the partially processed data may not be provided to the second sub-network unit as expected and inference generation by the inference model may experience undesirable interruptions.

In general, embodiments disclosed herein may provide methods, systems, and/or devices for managing inference models so that interruptions to inference generation due to differences in data privacy regulations are reduced. By doing so, the system may be more likely to provide desired computer-implemented services due to increased uptime of the inference model.

To manage the inference model, the system may include inference model manager 104. Inference model manager 104 may manage any number of inference models. To do so, inference model manager 104 may: (i) oversee training processes to obtain trained inference models, (ii) manage inference model repositories, (iii) oversee inference generation by the inference models, (iv) perform remedial actions when one or more inference models does not perform as expected, and/or (v) perform other actions.

To obtain a trained inference model, inference model manager 104 may obtain any number of previously trained sub-network units (and/or may train any number of sub-network units) and may compile the sub-network units to generate the trained inference model.

During the training process to train the sub-network units, snapshots of the sub-network units may be stored periodically. A snapshot of the sub-network unit may include information regarding a structure of the portion of the inference model associated with the sub-network unit. The information may include, for example, a set of weights of neurons of a neural network. Snapshots may be full snapshots or partial snapshots. For example, a partial snapshot may include only weights that have been modified since the previous snapshot, may include differences to indicate changes to weights, etc.

Therefore, inference model manager 104 (and/or another entity) may host a snapshot database (e.g., an inference model database, a sub-network unit database) that stores any number of snapshots of a sub-network unit. Refer to FIG. 2C for additional details regarding sub-network unit snapshots.

Inference model manager 104 may remediate potential interruptions to inference generation by: (i) identifying the first sub-network unit, the first sub-network unit generating first data that does not satisfy data privacy regulations using input data, (ii) obtaining a second sub-network unit that ingests the input data to generate second data that satisfies the data privacy regulations, (iii) replacing the first sub-network unit with the second sub-network unit to obtain an updated inference model, and/or (iv) executing the updated inference model to obtain an inference model result in accordance with the data privacy regulations.

Any number of snapshots of the first sub-network unit may be obtained during training of the first sub-network unit. For example, the first sub-network unit may include an encoder (e.g., a portion of an autoencoder) that generates latent representations of data. The latent representations of the data may include reduced-size representations of the data. To obtain the first sub-network unit, an autoencoder may be trained using training data until a reconstruction loss for the training data reconstructed by the autoencoder is below a threshold. An encoder of the autoencoder (e.g., a portion of the autoencoder including weights responsible for generating the latent representation) may be treated as the first sub-network unit.

A first snapshot of the first sub-network unit may include structural information for the first snapshot (e.g., values for weights, connections, etc.) and a reconstruction loss associated with the first snapshot may not be below the threshold.

A second snapshot of the first sub-network unit may also include structural information for the second snapshot (e.g., values for weights, connections, etc.) and a reconstruction loss associated with the second snapshot may be below the threshold. Therefore, the second snapshot may be used in the inference model as the first sub-network unit.

However, due to data privacy regulations, the first data generated by the second snapshot of the first sub-network unit may not be able to be provided to any downstream sub-network units of the inference model.

Therefore, in order to reduce interruptions to inference generation, inference model manager 104 may access the snapshot database to obtain the first snapshot of the first sub-network unit (and/or any other snapshot of the first sub-network unit obtained during training) and may treat the first snapshot of the first sub-network unit as the second sub-network unit.

The second sub-network unit may be associated with a higher reconstruction loss and, therefore, may produce the second data that meets the data privacy regulations due to a lower degree of predictive performance in reconstructing identifying information in the input data when compared with the first sub-network unit.

To perform the above-mentioned functionality, the system of FIG. 1 may include data sources 100, inference model manager 104, inference consumers 102, and/or other entities. Data sources 100, inference consumers 102, inference model manager 104, and/or any other type of devices not shown in FIG. 1 may perform all, or a portion of the computer-implemented services independently and/or cooperatively.

Figure 2A:
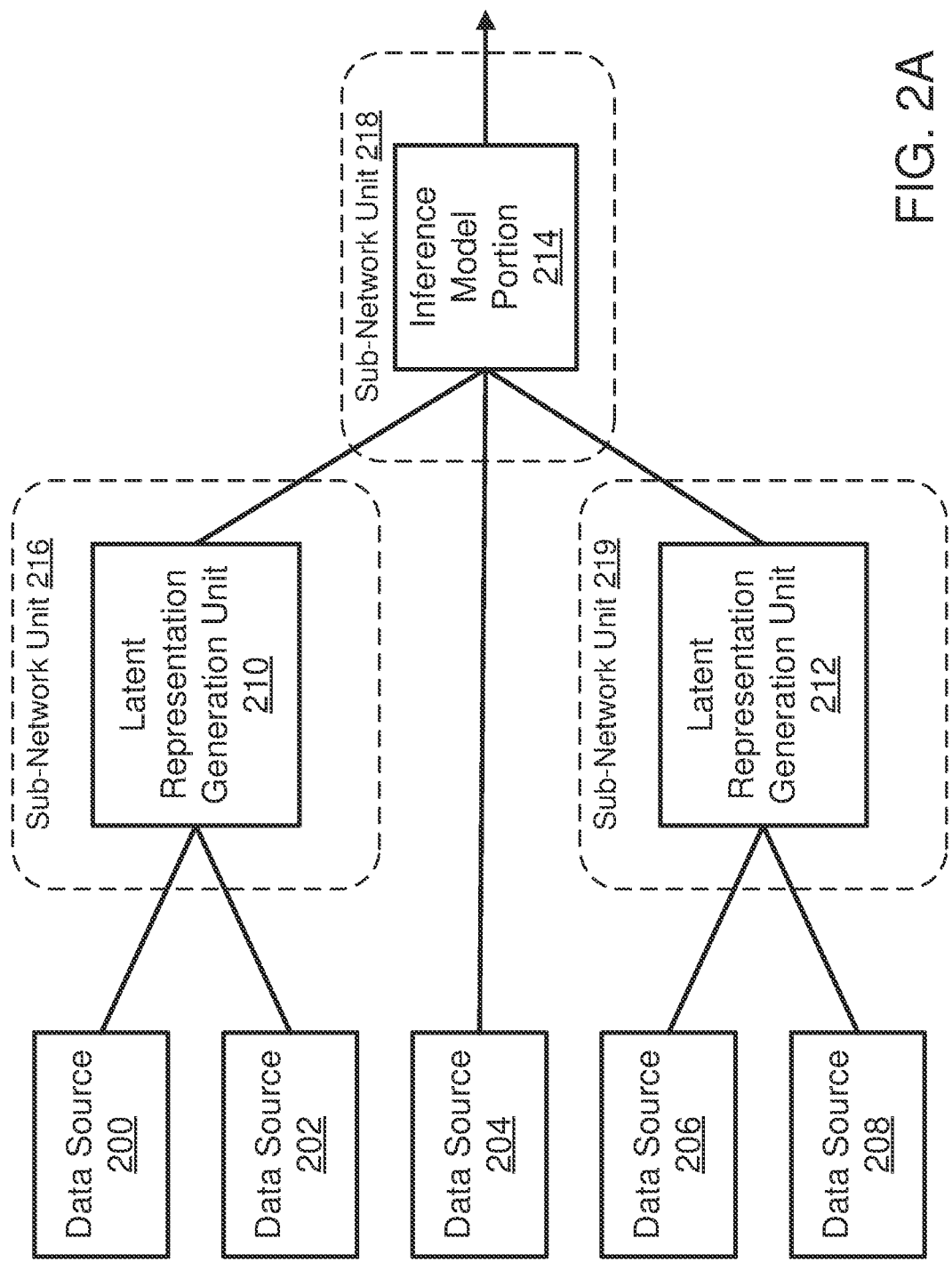

Data sources 100 may include any number and/or type of data sources. Data sources 100 may include, for example, data collectors, data aggregators, data repositories, and/or any other entity responsible for providing input data to inference models. Data sources 100 may be grouped (e.g., by inference model manager 104 prior to obtaining the inference model and/or by another entity at another time) into any number of groupings. Groupings of data sources 100 may include any number of data sources 100. For example, a first grouping of data sources 100 may include two data sources of data sources 100 and a second grouping of data sources 100 may include five data sources of data sources 100. Refer to FIG. 2A for additional details regarding groupings of data sources 100.

Inference consumers 102 may provide, all or a portion, of the computer-implemented services. When doing so, inference consumers 102 may consume inferences obtained by inference model manager 104 (and/or other entities using inference models managed by inference model manager 104). However, if inferences from inference models are unavailable, then inference consumers 102 may be unable to provide, at least in part, the computer-implemented services, may provide less desirable computer-implemented services, and/or may otherwise be impacted in an undesirable manner.

Figure 2B:
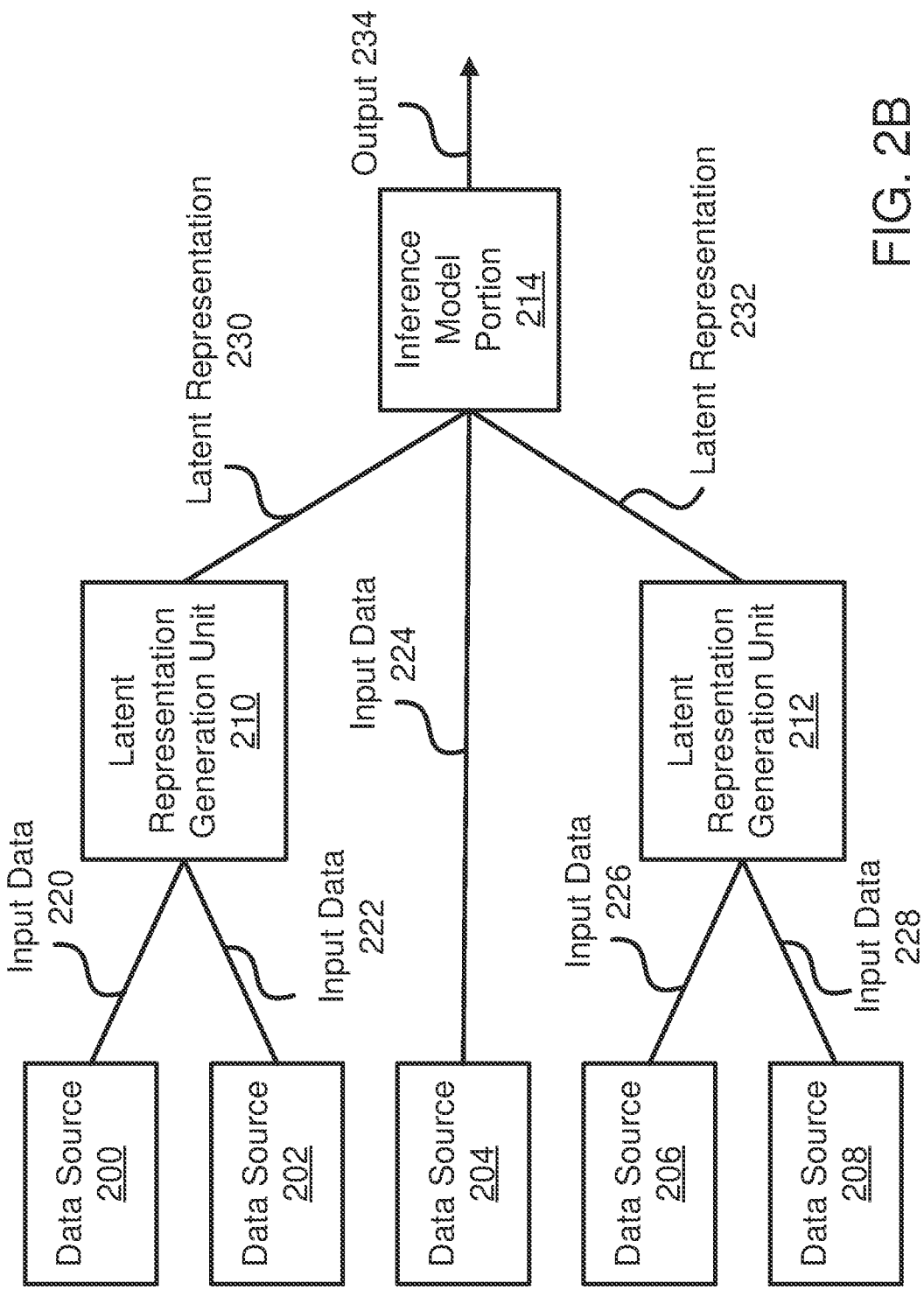
Figure 2E:
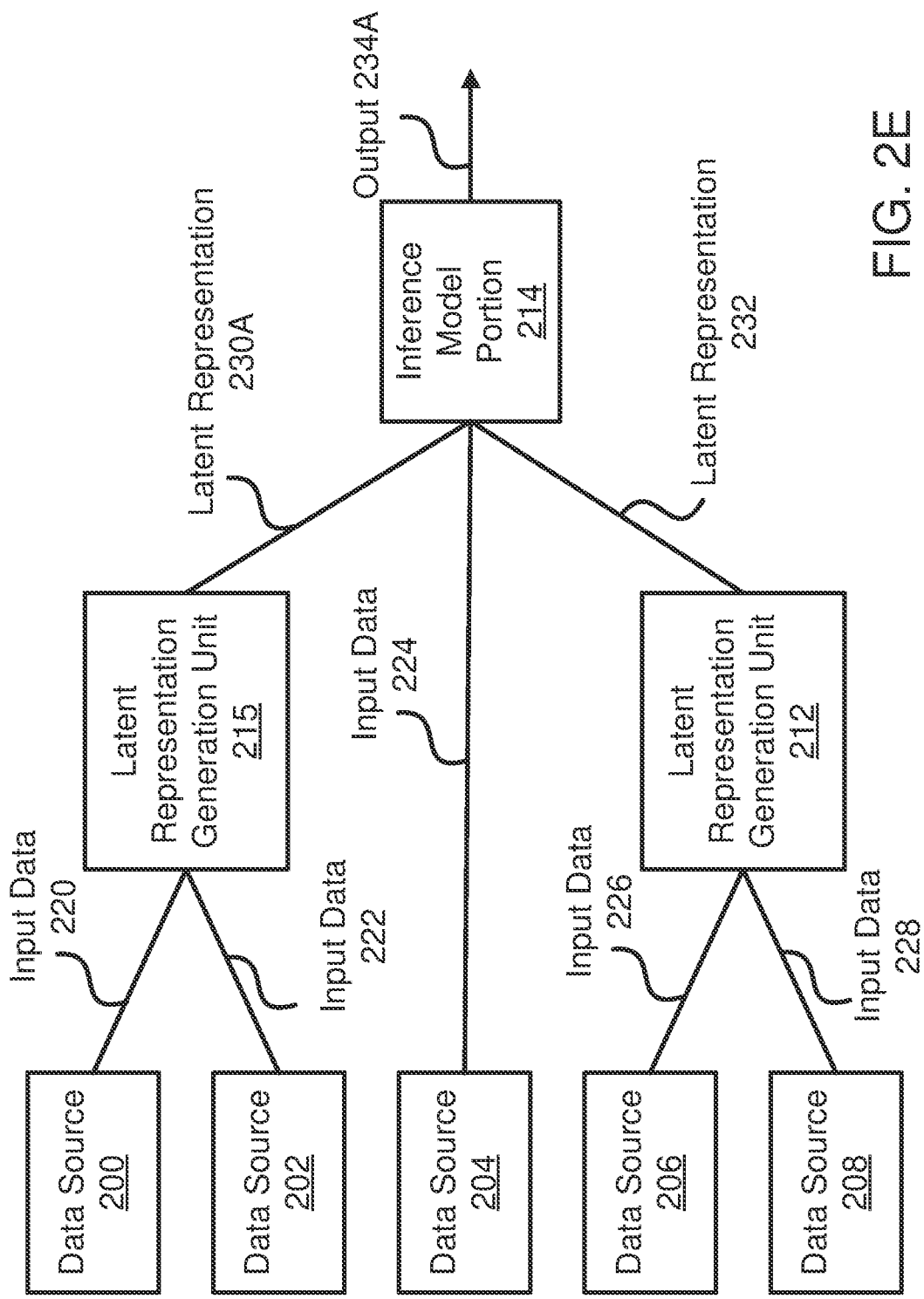
Figure 3:
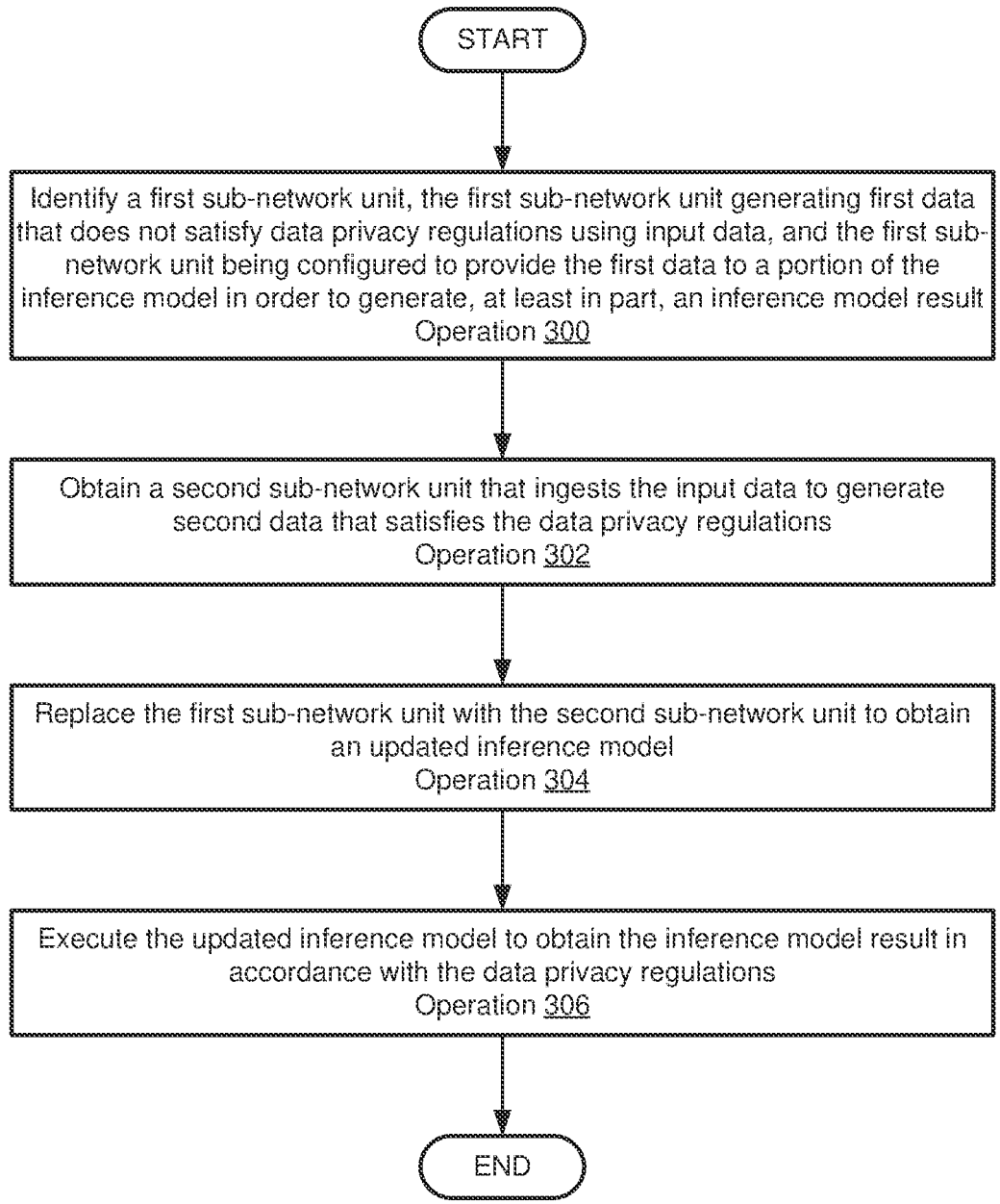
FIG. 3 shows a flow diagram illustrating a method of managing an inference model in accordance with an embodiment.

When performing its functionality, one or more of inference model manager 104, data sources 100, and inference consumers 102 may perform all, or a portion, of the methods and/or actions shown in FIGS. 2A-3.

Any of inference model manager 104, data sources 100, and inference consumers 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of inference model manager 104 and any of the data sources 100, and inference consumers 102).

While illustrated in FIG. 1 as included a limited number of specific components, a system in accordance with an embodiment may include fewer, additional, and/or different components than those illustrated therein.

The system described in FIG. 1 may be used to reduce the computational cost for mitigating the impact of differing data privacy regulations for inference models on inference consumers. The following processes described in FIGS. 2A-2E may be performed by the system in FIG. 1 when providing this functionality.

Turning to FIG. 2A, an example architecture of an inference model that includes sub-network units is shown. The inference model in FIG. 2A is shown as sourcing (e.g., obtaining) input data from five data sources (e.g., 200, 202, 204, 206, and 208). However, it may be appreciated that an inference model may source input data from any number of data sources without departing from embodiments disclosed herein. Each of the five data sources shown may represent any entity from which input data is obtained for the inference model. For example, data source 200 may be a data collector, a data aggregator, a data repository, a device storing any amount of data in storage, and/or any other entity.

To obtain the inference model architecture shown in FIG. 2A, data sources 200-208 may be divided into three groupings. For example, a first grouping may include data source 200 and data source 202, a second grouping may include data source 204, and a third grouping may include data source 206 and 208. The groupings may be formed based on any criteria including, for example, a likelihood that each data source will become unavailable at a same point in time, logical similarities between data sourced from each data source, etc. Specifically, data source 200 and data source 202 may have a highest likelihood (when compared to data sources 204, 206 and 208) of becoming unavailable at a first point in time and data sources 204-208 may be less likely to become unavailable at the first point in time.

Data source 200 and data source 202 may have the highest likelihood of becoming unavailable at the first point in time due to any criteria. For example, data source 200 and data source 202 may be data collectors including sensors positioned in a first ambient environment. A weather event (e.g., a storm) may occur in the first ambient environment and data source 200 and data source 202 may be equally impacted by the weather event. However, data source 204 may be a data collector located in a second ambient environment that is not proximate to the first ambient environment. Therefore, data source 204 may be unlikely to be impacted by the weather event and may not be included in the first grouping.

Following grouping data sources 200-208, it may be determined (e.g., by a user, by inference model manager 104 via any set of rules, by another entity) whether reduced-size representations of input data sourced from each grouping of data sources 200-208 are to be used.

For example, data source 200 and data source 202 together may generate a large quantity of input data and, therefore, a reduced-size representation of the large quantity of the input data may be favored for use in inference generation. Similarly, a network connection between data sources 200-202 and an entity hosting the inference model may have limited bandwidth available for transmission of the large quantity of the input data. Therefore, a reduced-size representation of the large quantity of the input data may be more easily transmitted to the entity hosting the inference model to use for inference generation.

It may be determined, therefore, that a reduced-size representation of input data from the first grouping (e.g., including data source 200 and data source 202) is to be generated prior to inference generation. To do so, latent representation generation unit 210 may be obtained.

To obtain latent representation generation unit 210, a first autoencoder may be trained using a first set of training data (e.g., from data source 200 and/or data source 202). Training the first autoencoder may include performing any training process using the first set of the training data so that a first set of weights for the first autoencoder are obtained. The first set of the weights may be iteratively modified until a latent representation (e.g., the reduced-size representation) of the first set of the training data may be generated and subsequently used to faithfully re-create the first set of the training data within a threshold.

A portion of the first autoencoder (e.g., including the weights usable to generate the latent representation) may be treated as latent representation generation unit 210. Therefore, input data sourced from data source 200 and data source 202 may be fed into latent representation generation unit 210 to obtain a latent representation of the input data, which may then be provided to inference model portion 214.

Latent representation generation unit 210 may be obtained via other methods and may generate reduced-size representations of data via other means (e.g., other than a portion of an autoencoder) without departing from embodiments disclosed herein.

Inference model portion 214 may include: (i) any number of sub-network units, (ii) any number of layers of a neural network inference model, and/or (iii) other data processing units usable to facilitate inference generation. Refer to FIG. 2B for an example inference generation process for the inference model.

It may also be determined that a reduced-size representation of input data from a second grouping (e.g., including data source 206 and data source 208) is to be generated prior to inference generation. To do so, latent representation generation unit 212 may be obtained using methods similar to those described with respect to latent representation generation unit 210.

Therefore, input data sourced from data source 206 and data source 208 may be fed into latent representation generation unit 212 to obtain a latent representation of the input data, which may then be provided to inference model portion 214 for further processing.

Lastly, it may be determined that a reduced-size representation of input data from a third grouping (e.g., including data source 204) is not to be generated prior to inference generation. Therefore, input data sourced from data source 204 may be fed directly into inference model portion 214 to be used for inference generation.

As previously mentioned, the inference model may include any number of sub-network units. The inference model described in FIG. 2A may include three sub-network units (e.g., sub-network unit 216, sub-network unit 218, and sub-network unit 219). Each sub-network unit may include at least a portion of the inference model. Specifically, sub-network unit 216 may include at least latent representation generation unit 210, sub-network unit 218 may include at least inference model portion 214, and sub-network unit 219 may include at least latent representation generation unit 212. While the inference model described in FIG. 2A is shown as including three sub-network units, it may be appreciated that inference models may include any number of sub-network units without departing from embodiments disclosed herein.

Turning to FIG. 2B, an example data flow during inference generation by the inference model described in FIG. 2A is shown.

Data source 200 may provide input data 220 to latent representation generation unit 210 and data source 202 may provide input data 222 to latent representation generation unit 210. Input data 220 and input data 222 may include any quantity and/or type of data usable by the inference model for inference generation. Although not shown in FIG. 2B, the inference model may include other elements such as, for example, any number of input layers of a neural network. Latent representation generation unit 210 may use input data 220 and input data 222 to generate latent representation 230.

To do so, latent representation generation unit 210 may include a portion of an autoencoder and may be trained to generate reduced-size representations of input data. Latent representation 230, therefore, may include a reduced-size representation of input data 220 and/or input data 222. The reduced-size representation may include, for example, attributes of input data 220 and input data 222. Refer to FIG. 2A for additional details regarding groupings of data sources for particular latent representation generation units. Latent representation 230 may be provided to inference model portion 214.

Data source 204 may provide input data 224 directly to inference model portion 214 without traversing a latent representation generation unit. This may occur due to, for example, a quantity and/or type of data included in input data 224. Specifically, data source 204 may generate less data than data source 200 and/or data source 202 and/or a type of data that is provided by data source 204 may be preferred to not be in the form of a latent representation (for any reason). While not shown in FIG. 2B, input data 224 may pass through additional inference model portions (e.g., including any number of input layers, any number of intermediate layers) prior to being fed into inference model portion 214.

Data source 206 may provide input data 226 to latent representation generation unit 212 and data source 208 may provide input data 228 to latent representation generation unit 212. Data sources 206 and 208 may be similar to any of data sources 200, 202, and/or 204. Latent representation generation unit 212 may be similar to latent representation generation unit 210. Latent representation generation unit 212 may generate, based on input data 226 and input data 228, latent representation 232 which may be provided to inference model portion 214.

Latent representation 230 may be fed into inference model portion 214 and may be used (along with input data 224 from data source 204 and latent representation 232 from latent representation generation unit 212) by inference model portion 214 to generate output 234. Inference model portion 214 may include any portion of the inference model including any number of sub-network units, any number of intermediate layers of a neural network, additional data processing units, etc. Output 234 may include at least partially processed data based on input data and latent representations of input data. Specifically, output 234 may be partially processed due to output 234 being fed into another sub-network unit (not shown in FIGS. 2A-2E) and/or other portions of the inference model to facilitate inference generation by the inference model.

Thus, the inference model depicted in FIG. 2B may process data as a portion of an inference generation process using input data from any number of data sources and using some number of latent representation generation units to modify at least a size of input data from a portion of the data sources. By associating data sources with trained latent representation generation units, portions of the inference model (e.g., sub-network units) may be modular. In other words, if a data source associated with the inference model becomes unavailable, a latent representation generation unit associated with the unavailable data source may be replaced with a similar latent representation generation unit. However, to do so, the inference model may be divided into any number of modular sub-network units including previously trained latent representation generation units. Refer to FIG. 2A for a visual depiction of the inference model divided into sub-network units.

Any sub-network units shown in FIGS. 2A-2B may be located in different geographical locations. For example, sub-network unit 216 shown in FIG. 2A may be located in a first geographical location and sub-network unit 218 may be located in a second geographical location. Devices located in the first geographical location may be subject to a first set of data privacy regulations and devices located in the second geographical location may be subject to a second set of data privacy regulations.

Specifically, the second geographical location may be subject to a data privacy regulation such as general data protection regulation (GDPR) and/or other data regulatory frameworks. The data privacy regulations may, therefore, limit distribution of the data (e.g., input data, latent representations of data, partially processed data).

Consider a scenario in which latent representation generation unit 210 is operated by a device located in the first geographical location and inference model portion 214 is operated by a device located in the second geographical location. Therefore, latent representation 230 may include a reduced-size representation of data that does not meet the data privacy regulations associated with inference model portion 214 and inference model portion 214 may not be able to obtain, ingest, or otherwise use latent representation 230.

To reduce interruptions to inference generation due to data privacy regulations, sub-network unit 216 may be modified so that a latent representation generated by the modified sub-network unit meets the data privacy regulations in effect for sub-network unit 218.

Turning to FIG. 2C, snapshots associated with sub-network unit 216 may be shown. Snapshot 240, snapshot 242, and snapshot 244 may be stored in a snapshot database, an inference model database, a sub-network unit database, and/or any other storage architecture.

During a training process for sub-network unit 216, an autoencoder may be trained using training data. To train the autoencoder, characteristics of the autoencoder (e.g., weights, etc.) may be iteratively changed. For example, the weights of the autoencoder may be chosen (e.g., based on another autoencoder, randomly, based on a previously determined set of rules and/or goals for the autoencoder) and an output of the autoencoder (e.g., reconstructed input data) may be compared to the input data to obtain a reconstruction loss for the autoencoder. The reconstruction loss may indicate a difference between the input data and the reconstructed input data. A predictive performance measurement may be assigned to the autoencoder based on the difference and the predictive performance measurement may be compared to a predictive performance goal (e.g., a threshold).

If the predictive performance measurement does not meet the predictive performance goal, at least a portion of the weights may be changed (e.g., randomly, according to a set of rules) until a predictive performance measurement of the autoencoder meets the predictive performance goal.

A first set of weights (e.g., first iteration weights 246) may be generated for the autoencoder. Training data (not shown) may be fed into the autoencoder using first iteration weights 246 and a first output of the autoencoder may be compared to the training data to obtain reconstruction loss 248 of 50%. Reconstruction loss 248 may correspond to predictive performance 250 of 50%. First iteration weights 246, reconstruction loss 248, and predictive performance 250 may be saved in the snapshot repository as snapshot 240. Therefore, the first iteration of the autoencoder may be regenerated as needed using first iteration weights 246 and/or other data that may be included in snapshot 240.

To determine whether to use snapshot 240 in the inference model, first predictive performance goal 264 may be imposed on the autoencoder. First predictive performance goal 264 may indicate that a predictive performance measurement of the autoencoder must be at least 80% predictive performance to meet first predictive performance goal 264. Therefore, snapshot 240 may not meet first predictive performance goal 264 and may not be included in the inference model.

To meet first predictive performance goal 264, additional snapshots of the autoencoder may be generated during the training process. For example, snapshot 242 may include second iteration weights 252, reconstruction loss 254 of 30%, and predictive performance 256 of 70%. Snapshot 242 may also not meet first predictive performance goal 264 and, therefore, snapshot 244 may be generated.

Snapshot 244 may include third iteration weights 258, reconstruction loss 260 of 15%, and predictive performance 262 of 85%. Snapshot 244 may, therefore, meet first predictive performance goal 264 and may be an iteration of the autoencoder usable by the inference model. An encoder (e.g., a portion of the autoencoder that includes weights usable to generate the latent representation) may be treated as sub-network unit 216.

However, upon deployment of the inference model, it may be determined that an output of sub-network unit 216 (e.g., latent representation 230 shown in FIG. 2B) may be required to meet data privacy regulations that are not met currently by the output of sub-network unit 216. Specifically, latent representation 230 generated by latent representation generation unit 210 may include identifying information that may not be usable by inference model portion 214.

Therefore, sub-network unit 216 may be replaced with a sub-network unit that may generate an output that meets the data privacy regulations imposed on inference model portion 214. To do so, second predictive performance goal 266 of 70% may be generated and/or otherwise obtained based on the data privacy regulations. Therefore, a snapshot of the autoencoder that has a higher reconstruction loss than snapshot 244 may be used to replace sub-network unit 216.

Snapshot 242 may meet second predictive performance goal 266, as predictive performance 256 indicates 70% predictive performance and second predictive performance goal 266 may indicate that a predictive performance of 70% may meet second predictive performance goal 266. Therefore, snapshot 242 (and second iteration weights 252) may be restored to obtain a second autoencoder. A second encoder of the second autoencoder may be used as a latent representation generation unit usable to replace latent representation generation unit 210.

Turning to FIG. 2D, sub-network unit 216 may be removed from the inference model. Sub-network unit 216 may be removed permanently and/or temporarily. Sub-network unit 216 may be replaced in the inference model architecture with sub-network unit 217. Sub-network unit 217 include latent representation generation unit 215 and latent representation generation unit 215 may be based on snapshot 242 described in FIG. 2C.

Turning to FIG. 2E, an example updated inference model is shown. To resume inference generation, data source 200 may provide input data 220 to latent representation generation unit 215 and data source 202 may provide input data 222 to latent representation generation unit 215. Latent representation generation unit 215 may use input data 220 and input data 222 to generate latent representation 230A.

To do so, latent representation generation unit 215 may include a portion of an autoencoder and may be trained to generate reduced-size representations of input data. Latent representation 230A, therefore, may include a reduced-size representation of input data 220 and/or input data 222. The reduced-size representation may include, for example, attributes of input data 220 and input data 222. Latent representation 230A may be provided to inference model portion 214. Latent representation 230A may meet data privacy regulations imposed on inference model portion 214 and, therefore, may be ingested by inference model portion 214 to facilitate inference generation.

Data source 204 may provide input data 224 directly to inference model portion 214 without traversing a latent representation generation unit as described in FIG. 2B.

Data source 206 may provide input data 226 to latent representation generation unit 212 and data source 208 may provide input data 228 to latent representation generation unit 212 as described in FIG. 2B.

Latent representation 230A may be fed into inference model portion 214 and may be used (along with input data 224 from data source 204 and latent representation 232 from latent representation generation unit 212) by inference model portion 214 to generate output 234A. Output 234A may include any amount of partially processed data that may be used by additional (not shown) sub-network units of the inference model to as a part of inference generation by the inference model.

In an embodiment, the one or more entities performing the operations shown in FIGS. 2A-2E are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to manage inference models. FIG. 3 illustrates methods that may be performed by the components of FIG. 1. In the diagrams discussed below and shown in FIG. 3, any of the operations may be repeated, performed in different orders, and/or performed in parallel with or in a partially overlapping in time manner with other operations.

Turning to FIG. 3, a flow diagram illustrating a method of managing an inference model in accordance with an embodiment is shown. The method may be performed by a data processing system, inference model manager, data source, inference consumer, and/or another device.

At operation 300, a first sub-network unit may be identified. The first sub-network unit may generate first data that does not satisfy data privacy regulations using input data and the first sub-network unit may be configured to provide the first data to a portion of the inference model in order to generate, at least in part, an inference model result. Identifying the first sub-network unit may include: (i) obtaining first reconstructed input data using, at least, the first sub-network unit and a portion of the input data, (ii) obtaining a reconstruction loss based on the first reconstructed input data and the input data, and/or (iii) determining whether the first data satisfies the data privacy regulations based on the reconstruction loss and a reconstruction threshold.

Obtaining the first reconstructed input data may include: (i) generating, using an encoder of the first sub-network unit and the input data, a latent representation of the input data, (ii) reconstructing, using a decoder corresponding to the encoder (e.g., the decoder being a second portion of an autoencoder and the encoder being a first portion of the autoencoder) and the latent representation of the input data, the input data to generate the first reconstructed input data, and/or (iii) other methods.

Obtaining the first reconstructed input data may also include querying another entity responsible for generating the first reconstructed input data and receiving the reconstructed input data in response to the query.

Obtaining the reconstruction loss may include comparing the input data to the reconstructed input data to generate a quantification of error between the input data and the reconstructed input data. The quantification of the error may be a mean square error, a binary cross entropy, and/or any other type of error calculation. The quantification of the error may be treated as the reconstruction loss.

Obtaining the reconstruction loss may also include providing the input data and the first reconstructed input data to another entity responsible for calculating the reconstruction loss and receiving the reconstruction loss from the entity.

Determining whether the first data satisfies the data privacy regulations may include: (i) obtaining the reconstruction threshold, and/or (ii) comparing the reconstruction loss to the reconstruction loss threshold. If the reconstruction loss is below the reconstruction threshold, the first data may not meet the data privacy regulations. If the reconstruction loss exceeds the reconstruction threshold, the first data may meet the data privacy regulations.

Obtaining the reconstruction threshold may include: (i) reading the reconstruction threshold from storage, (ii) receiving the reconstruction threshold from another entity, and/or (iii) generating the reconstruction loss based, at least in part, on the data privacy regulations.

If the reconstruction loss is below the reconstruction threshold, the reconstruction loss may be considered too low to meet the data privacy regulations and, therefore, the latent representation of the input data may be able to be reconstructed to an extent that may violate the data privacy regulations. If the reconstruction loss exceeds the reconstruction threshold, the reconstruction loss may not be considered too low to meet the data privacy regulations and, therefore, the latent representation of the input data may not be able to be reconstructed to an extent that may violate the data privacy regulations.

The reconstruction threshold may include multiple thresholds. For example, the reconstruction threshold may indicate a range (e.g., a minimum and a maximum value) for the reconstruction loss so that the latent representation of the input data retains useful information while complying with the data privacy regulations.

Consequently, it may be identified that the first sub-network unit does not satisfy the data privacy regulations.

At operation 302, a second sub-network unit that ingests the input data to generate second data that satisfies the data privacy regulations may be obtained. Obtaining the second sub-network unit may include: (i) reading the second sub-network unit from storage (e.g., a sub-network unit repository storing sub-network snapshots as described in FIG. 2C), the second sub-network unit having a previously determined reconstruction loss, and/or (ii) determining that the previously determined reconstruction loss for the second sub-network unit meets the data privacy regulations.

Obtaining the second sub-network unit may also include: (i) reading the second sub-network unit from storage, (ii) performing a testing process to determine the reconstruction loss associated with the second sub-network unit (e.g., using methods similar to those described above with respect to the first sub-network unit, and/or (iii) determining that the calculated reconstruction loss for the second sub-network unit meets the data privacy regulation.

Obtaining the second sub-network unit may also include: (i) generating the second sub-network unit by generating the second sub-network unit, (ii) receiving the second sub-network unit from another entity, and/or (iii) other methods.

At operation 304, the first sub-network unit may be replaced with the second sub-network unit to obtain an updated inference model. Replacing the first sub-network unit with the second sub-network unit may include: (i) storing the first sub-network unit in the sub-network unit repository, (ii) adding the second sub-network unit to the inference model, (iii) modifying instructions for execution of the inference model so that the second sub-network unit begins requesting input data from the second set of the data sources and provides latent representations of the requested input data to another portion of the inference model, and/or (iv) other methods.

At operation 306, the updated inference model may be executed to obtain an inference model result. Executing the updated inference model may include: (i) obtaining input data from any number of data sources, (ii) executing instructions (e.g., to generate latent representations of the input data) to generate an inference, and/or (iii) providing the inference to an inference consumer.

The method may end following operation 306.

Following operation 306, a computer-implemented service may be provided using the inference model result. Providing the computer-implemented service may include: (i) providing the inference model result to the inference consumer, (ii) performing additional data processing using the inference model result, (iii) storing the inference model result in an inference model result repository, (iv) analyzing the inference model result to generate diagnostic information (e.g., a reconstruction loss) for the inference model, and/or (v) other methods.

Figure 4:
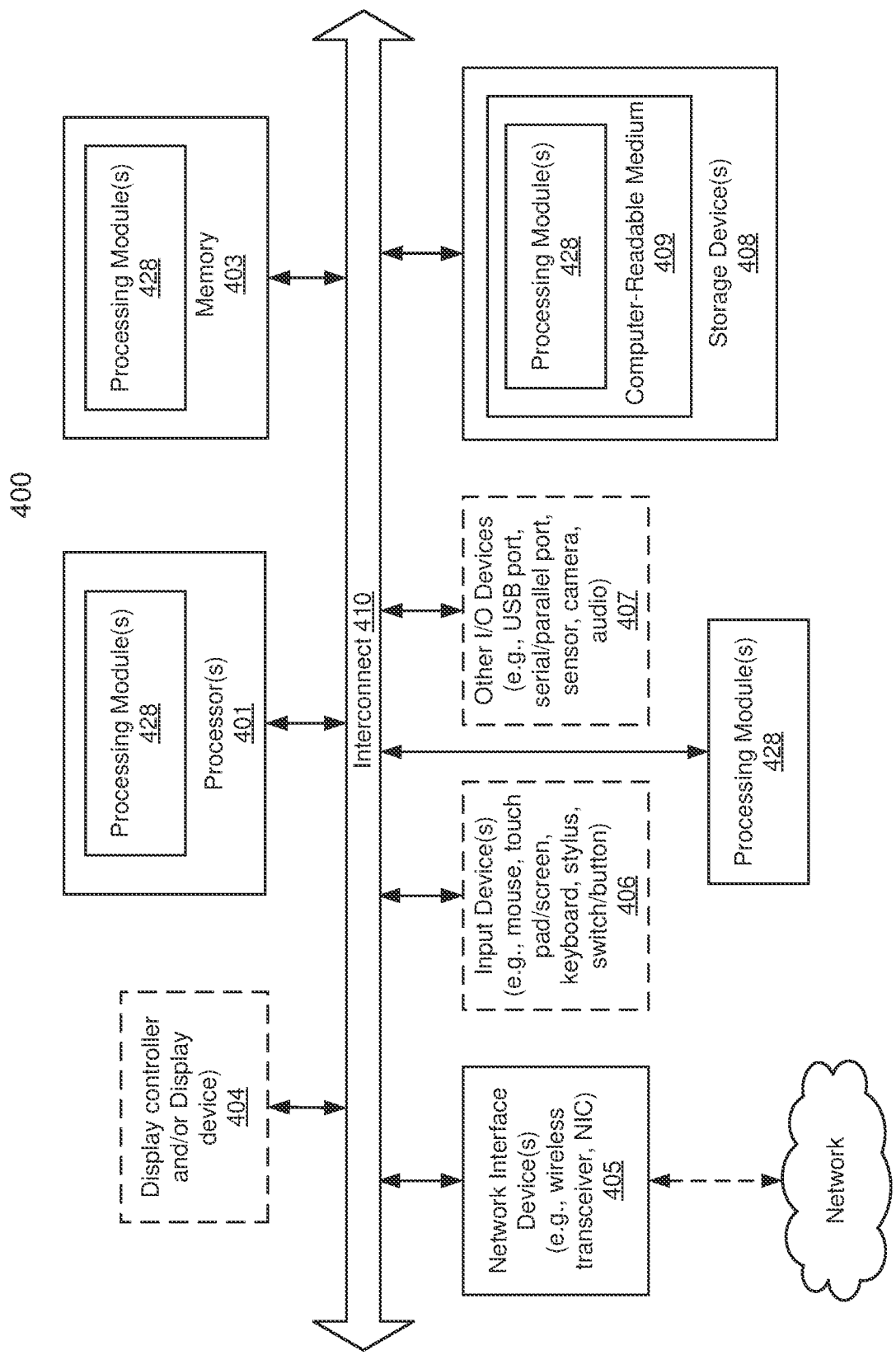
FIG. 4 shows a block diagram illustrating a data processing system in accordance with an embodiment.

Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing an inference model that comprises sub-network units, the method comprising:
    identifying a first sub-network unit of the sub-network units, the first sub-network unit generating first data that does not satisfy data privacy regulations using input data, and the first sub-network unit being configured to provide the first data to a portion of the inference model in order to generate, at least in part, an inference model result;

obtaining a second sub-network unit that ingests the input data to generate second data that satisfies the data privacy regulations;
replacing the first sub-network unit with the second sub-network unit to obtain an updated inference model; and
executing the updated inference model to obtain the inference model result in accordance with the data privacy regulations.

2. The method of claim 1, wherein the data privacy regulations limit distribution of the input data.

3. The method of claim 2, wherein the first sub-network unit is not subject to the data privacy regulations and the portion of the inference model is subject to the data privacy regulations.

4. The method of claim 1, wherein identifying the first sub-network unit comprises:
obtaining first reconstructed input data using, at least, the first sub-network unit and a portion of the input data;
obtaining a reconstruction loss based on the first reconstructed input data and the input data; and
making a determination regarding whether the first data satisfies the data privacy regulations based on the reconstruction loss and a reconstruction threshold.

5. The method of claim 4, wherein the first sub-network unit is trained during a training process using training data and a first predictive performance goal, the second sub-network unit is obtained via a portion of the training process that uses the training data and a second predictive performance goal, and the first predictive performance goal is different from the second predictive performance goal.

6. The method of claim 5, wherein second reconstructed input data obtained using, at least, the second sub-network unit and the portion of the input data, satisfies the data privacy regulations based on the reconstruction threshold, the reconstruction threshold specifying a minimum level of difference between the second reconstructed input data and the portion of the input data.

7. The method of claim 1, wherein the first sub-network unit comprises a portion of an autoencoder, and the autoencoder being trained to reproduce the input data.

8. The method of claim 7, wherein the first sub-network unit comprises an encoder of the autoencoder, and the second sub-network unit comprises a second encoder of a second autoencoder.

9. The method of claim 8, wherein the encoder is trained to generate a reduced-size representation of the input data.

10. The method of claim 1, further comprising:
providing a computer-implemented service using the inference model result.

11. A non-transitory machine-readable medium having instructions stored therein, which when executed by a processor, cause the processor to perform operations for managing an inference model that comprises sub-network units, the operations comprising:
identifying a first sub-network unit of the sub-network units, the first sub-network unit generating first data that does not satisfy data privacy regulations using input data, and the first sub-network unit being configured to provide the first data to a portion of the inference model in order to generate, at least in part, an inference model result;
obtaining a second sub-network unit that ingests the input data to generate second data that satisfies the data privacy regulations;
replacing the first sub-network unit with the second sub-network unit to obtain an updated inference model; and
executing the updated inference model to obtain the inference model result in accordance with the data privacy regulations.

12. The non-transitory machine-readable medium of claim 11, wherein the data privacy regulations limit distribution of the input data.

13. The non-transitory machine-readable medium of claim 12, wherein the first sub-network unit is not subject to the data privacy regulations and the portion of the inference model is subject to the data privacy regulations.

14. The non-transitory machine-readable medium of claim 11, wherein identifying the first sub-network unit comprises:
obtaining first reconstructed input data using, at least, the first sub-network unit and a portion of the input data;
obtaining a reconstruction loss based on the first reconstructed input data and the input data; and
making a determination regarding whether the first data satisfies the data privacy regulations based on the reconstruction loss and a reconstruction threshold.

15. The non-transitory machine-readable medium of claim 14, wherein the first sub-network unit is trained during a training process using training data and a first predictive performance goal, the second sub-network unit is obtained via a portion of the training process that uses the training data and a second predictive performance goal, and the first predictive performance goal is different from the second predictive performance goal.

16. A data processing system, comprising:
a processor; and
a memory coupled to the processor to store instructions, which when executed by the processor, cause the processor to perform operations for managing an inference model that comprises sub-network units, the operations comprising:
identifying a first sub-network unit of the sub-network units, the first sub-network unit generating first data that does not satisfy data privacy regulations using input data, and the first sub-network unit being configured to provide the first data to a portion of the inference model in order to generate, at least in part, an inference model result;
obtaining a second sub-network unit that ingests the input data to generate second data that satisfies the data privacy regulations;
replacing the first sub-network unit with the second sub-network unit to obtain an updated inference model; and
executing the updated inference model to obtain the inference model result in accordance with the data privacy regulations.

17. The data processing system of claim 16, wherein the data privacy regulations limit distribution of the input data.

18. The data processing system of claim 17, wherein the first sub-network unit is not subject to the data privacy regulations and the portion of the inference model is subject to the data privacy regulations.

19. The data processing system of claim 16, wherein identifying the first sub-network unit comprises:
obtaining first reconstructed input data using, at least, the first sub-network unit and a portion of the input data;
obtaining a reconstruction loss based on the first reconstructed input data and the input data; and making a determination regarding whether the first data satisfies the data privacy regulations based on the reconstruction loss and a reconstruction threshold.

20. The data processing system of claim 19, wherein the first sub-network unit is trained during a training process using training data and a first predictive performance goal, the second sub-network unit is obtained via a portion of the training process that uses the training data and a second predictive performance goal, and the first predictive performance goal is different from the second predictive performance goal.

* * * * *